No. 812,638. PATENTED FEB. 13, 1906.
A. M. CATHEY.
TRANSFERRING APPARATUS.
APPLICATION FILED DEC. 12, 1905.
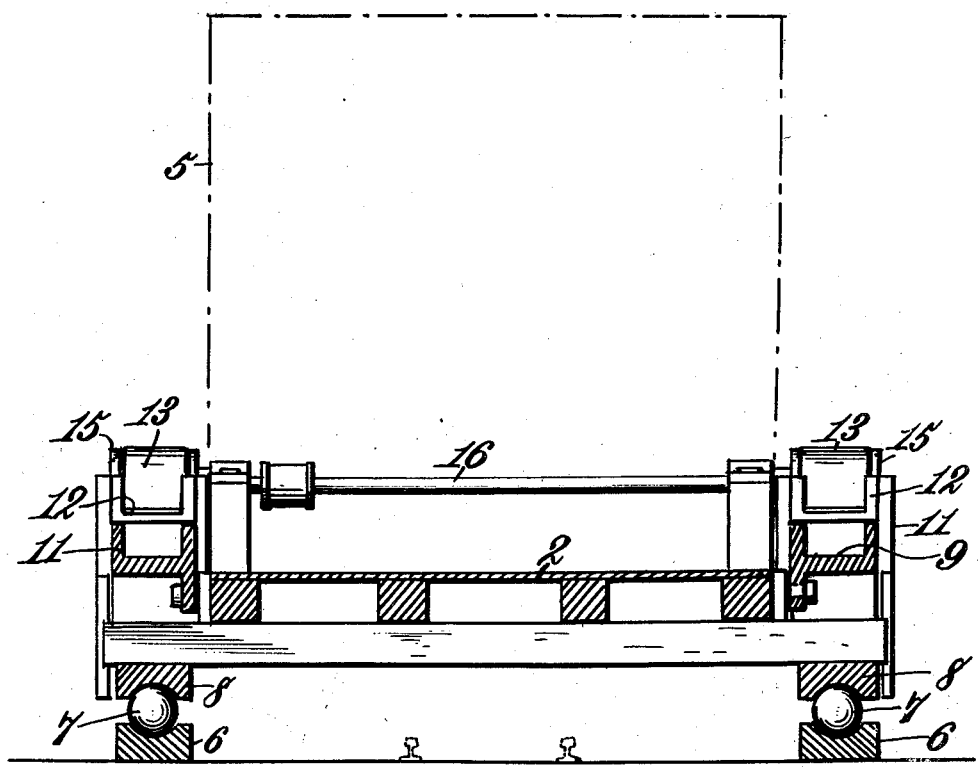
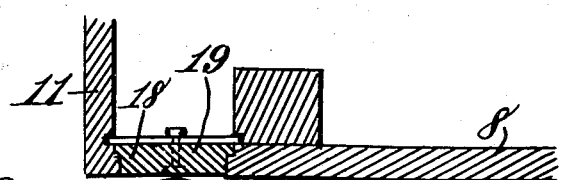

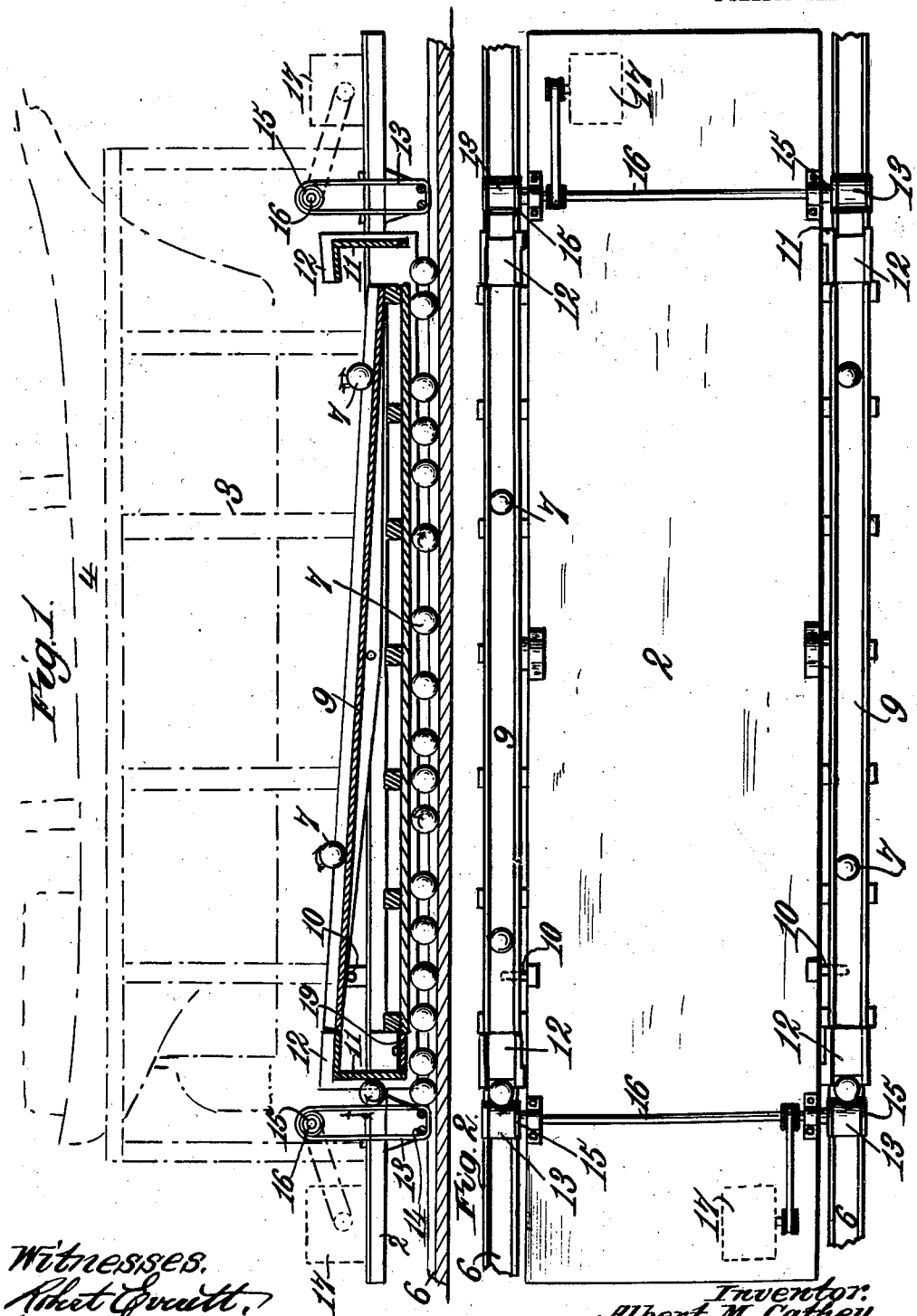

UNITED STATES PATENT OFFICE.

ALBERT M. CATHEY, OF DAVIDSON, NORTH CAROLINA.

TRANSFERRING APPARATUS.

No. 812,638.          Specification of Letters Patent.          Patented Feb. 13, 1906.

Application filed December 12, 1905. Serial No. 291,487.

*To all whom it may concern:*

Be it known that I, ALBERT M. CATHEY, a citizen of the United States, residing at Davidson, in the county of Mecklenburg and State of North Carolina, have invented new and useful Improvements in Transferring Apparatus, of which the following is a specification.

This invention relates to a transferring apparatus capable of moving bodies from one place to another.

The apparatus may be used with advantage in various connections, it being of particular utility for transferring large or bulky objects, such as boats, ships, and vessels.

The apparatus involves a carriage or truck and rollers for supporting the carriage or truck, the rollers being free of said carriage or truck by reason of which there are no journals, such as would be presented by axles, to be subjected to strains. The carriage and rollers may be of any desirable kind. For the rollers I may advantageously employ balls or spheres. The carriage or truck may carry a cradle or other frame to directly sustain a ship or other object, or when the carriage is used for conveying a ship it may be provided with a tank to receive such ship. These matters of detail, however, may be varied to meet the particular requirement to which the apparatus is put.

As a part of the apparatus I employ mechanism for transferring the rollers from one point to another. In the present case the rollers are transferred from the rear end to the front end of the apparatus or for what is for the time being these portions.

As will hereinafter be explained, the apparatus is capable of moving in opposite directions, and I effect positive movement of the rollers during both of such movements.

In the drawings accompanying and forming a part of this specification I show an effective embodiment of apparatus including my invention, which to enable those skilled in the art to practice said invention I will set forth in detail in the following description, while the novelty of said invention will be included in the claims succeeding said description.

In said drawings, Figure 1 is a sectional side elevation of a transferring apparatus embodying the invention. Fig. 2 is a top plan view of said apparatus. Fig. 3 is a transverse sectional view of the apparatus showing a slight modification thereof. Fig. 4 is a sectional detail upon a scale slightly larger than that of Figs. 1 and 2.

Like characters refer to like parts throughout the several figures.

As will be understood from what has been hereinbefore stated, the apparatus can be successfully employed in many different ways for transferring objects of different kinds. It is of especial use, however, in moving large objects, such as a ship. In this particular use the apparatus can be used for moving a ship across a neck of land from a body of water on one side thereof to a body of water on the opposite side thereof.

The apparatus includes in its make-up a carriage or truck, and the same may be of any desirable character. I have shown in Figs. 1 to 3, inclusive, of the drawings a carriage or truck 2, and it may be of wood, steel, or composite construction, this depending upon the character, size, or weight of the body to be moved.

I deem it unnecessary to go into a detailed construction of the body of the truck or carriage, for this does not concern the invention. The carriage or truck may be provided with a cradle, denoted in a general way by 3 in Fig. 1 and in which a boat, ship, or vessel, as 4, may lie, both the cradle and ship or boat being shown by dotted lines in said figure.

Instead of a cradle the truck may carry a tank, as 5, as shown by dotted lines in Fig. 3, and into which a boat or ship may be floated. It will be understood, therefore, that the means for carrying the object, such as a vessel, upon the carriage or truck may be of various kinds.

In connection with the apparatus I prefer to employ a track in order to properly guide the same, and the track may be of any desirable form. The one shown consists of parallel rails, as 6. As previously indicated, the carriage is supported by rollers, and these may be of any suitable form, the ones shown being designated by 7 and being of spherical or ball shape. To prevent lateral motion of the rollers, I prefer to groove the rails 6 on their upper sides and to correspondingly groove the under sides of the stringers 8, extending longitudinally of, fastened to, and forming part of the carriage or truck 2. There are two series of rollers in the present case, as will be understood, and each series travels in a groove in a rail 6 and stringer 8, respectively. By forming grooves in these parts it will not be possible for the rollers to bodily move transversely of the apparatus when the latter is in motion. At this point it might be stated that the carriage or truck may be moved in any desirable way. By employing rollers of spherical form even uniform wear thereof is assured. The rollers are wholly free of the carriage, so that there are no journals present to be subjected to stress or wear.

When the rollers 7 reach or substantially reach the rear portion of the carriage or truck and pass out of contact with the stringers 8, I provide means for elevating the same and then moving them in the direction of travel of the carriage. When the carriage is traveling toward the right in Fig. 1, the rollers are moved toward the right after they have been lifted above the track or runway upon which the rollers revolve.

I will now describe the mechanism illustrated for accomplishing the elevation and then the movement of the rolls. Said mechanism involves a tilting member composed in the present case of two oscillatory members or levers 9 of duplicate construction fulcrumed substantially centrally between their ends for rocking motion upon the carriage or truck 2, as seen best in Figs. 1 and 2. These oscillatory members 9 are channeled or grooved to properly guide the rollers when moving from one end thereof to the other. The oscillatory members 9 are shown in Fig. 1 as occupying an inclined relation and such a one as to permit the travel of the rollers from the left toward the right in said figure. The relation, however, may be reversed, so as to permit the balls or rollers to travel from the right toward the left. To maintain the oscillatory members in fixed relation, removable pins, as 10, may be employed, said pins being shown in their working positions in Fig. 1.

At opposite sides of the carriage or truck and near the opposite ends thereof are arranged grooved members 11, represented as vertically disposed, and the lower edges of which are separated from the rails 6 a distance substantially equal to the diameter of the rollers. These grooved members 11, as will be understood, are arranged in pairs and are located directly over the respective rails 6. Each of them has an inwardly-extending overhanging grooved head 12, arranged at an inclination whereby the heads 12 at one end of the apparatus can register with the adjacent ends of the oscillatory members 9 when the latter are in roller-transferring position, as shown clearly in Fig. 1. The ends of the oscillatory members 9, as will be obvious, can be brought into register with the grooved heads 12 on the right of the apparatus when it becomes necessary to transfer the rollers from the right toward the left. In either case the rollers are transferred from the rear portion of the apparatus toward the front portion thereof, these portions depending upon the direction in which the apparatus may be moving.

At opposite ends of the apparatus or substantially thereat I provide elevating means for the rollers, and the same may be of any desirable character. The means shown for this purpose, however, will now be set forth. Arranged opposite each of the grooved members 11 is a belt 13 of endless form. The lower ends of the belts are arranged in proximity to the rails 6 and are passed around guide-rollers, as 14, carried by hangers pendent from the carriage or truck 2 and in horizontal alinement. The upper portions of the belts are passed around pulleys, as 15, upon shafts, as 16, suitably supported upon said carriage and located upon the deck thereof. The belts are separated from the coöperating grooved members 11 a distance approximately equal to the diameter of the rollers. The shafts 16 are located above the deck of the carriage 2 and they may be driven in any desirable way—for example, by means of motors, as 17, belted or otherwise operatively connected thereto. I have shown the motors 17 simply conventionally. They may be of any type.

As the carriage moves from the right toward the left the rollers 7 are brought successively against the lower ends of the belts 13 at the rear of the apparatus, and said belts moving in the direction of the arrow serve to elevate the rollers upward along the coöperating grooved members 11 until they reach the inclined heads of said grooved members. When the heads 12 are reached, the rollers enter the same and then travel upon the downwardly and forwardly inclined oscillatory members 9. Leaving the said members 9, the rollers drop onto the rails 6, which they can do by passing through the space between the front ends of the stringers 8 and the front grooved members 11. When the apparatus is traveling toward the left, the belts 13 on the right become effective for lifting the rollers.

There is a space shown in Fig. 1 between the right ends of the stringers 8 and the grooved members 11 on the right. When traveling toward the right, these spaces are open, but the corresponding spaces on the left are closed, for which purpose filling-pieces, as 18, are illustrated, said filling-pieces being held in place by fastening devices, denoted in a general way each by 19. (See Fig. 4.) The filling-pieces 19 are shown in operative positions on the left of the apparatus in Fig. 1, as the apparatus is supposed to be traveling toward the right. When the apparatus is traveling toward the left in said figure, the filling-pieces will be removed and inserted in the spaces between the right ends of the stringers 8 and the grooved members 11 on the right. It will be supposed that the apparatus is traveling toward the right in said Fig. 1. The filling-pieces 18 prevent the rollers from jumping up into the space between the stringers and the grooved members during such motion. Their under faces, however, are slightly above the corresponding surfaces of the two stringers, so that the filling-pieces do not interpose any resistance to the relative motion of the carriage and rollers.

What I claim is—

1. In an apparatus of the class described, a carriage, rollers for supporting the carriage and free thereof combined with mechanism for transferring rollers from one point to another.

2. In an apparatus of the class described, a carriage, rollers for supporting the carriage and free thereof combined with mechanism for transferring the rollers from one end of the carriage to the other end thereof.

3. In an apparatus of the class described, a runway, rollers on the runway, a carriage supported by and free of the rollers, and mechanism for transferring the rollers from one point on the runway to another point.

4. In an apparatus of the class described, a carriage, rollers for supporting the carriage and free thereof, parallel grooved rails to receive the rollers, and mechanism for lifting the rollers from off the rails when the carriage has passed from off the same and for returning the rollers to a point in front of the carriage.

5. In an apparatus of the class described, a carriage, rollers for supporting and free of the carriage, and mechanism for elevating the rollers when the carriage has passed from off the same and returning the rollers to a point in front of the carriage.

6. In an apparatus of the class described, a carriage having parallel grooved stringers, parallel grooved rails, rollers movable freely in the grooves of the respective parts, and means for lifting the rollers from off the rails when the carriage has passed thereover and for returning said rollers to a point in front of the carriage.

7. In an apparatus of the class described, a carriage, rollers for supporting the carriage and free thereof, means for lifting the rollers when the carriage has passed from off the same, and an inclined way onto which the rollers are delivered by the elevating means, for conducting said rollers to the front of the carriage.

8. In an apparatus of the class described, a carriage, rollers for supporting and free of the carriage, elevating means at the opposite ends of the carriage for lifting the rollers from their normal level, members along which the rollers travel when under the action of the elevating means, and a tiltable member adapted to assume opposite inclinations and to cooperate alternately with said members, whereby rollers received from the latter can gravitate therealong.

In testimony whereof I have hereunto set my hand in presence of two subscribing witnesses.

ALBERT M. CATHEY.

Witnesses:
HEATH SUTHERLAND,
BERNARD P. VASHON.